Nov. 2, 1943.    F. K. VAN ALMELO    2,333,602
HEATING
Filed April 9, 1941    2 Sheets-Sheet 2
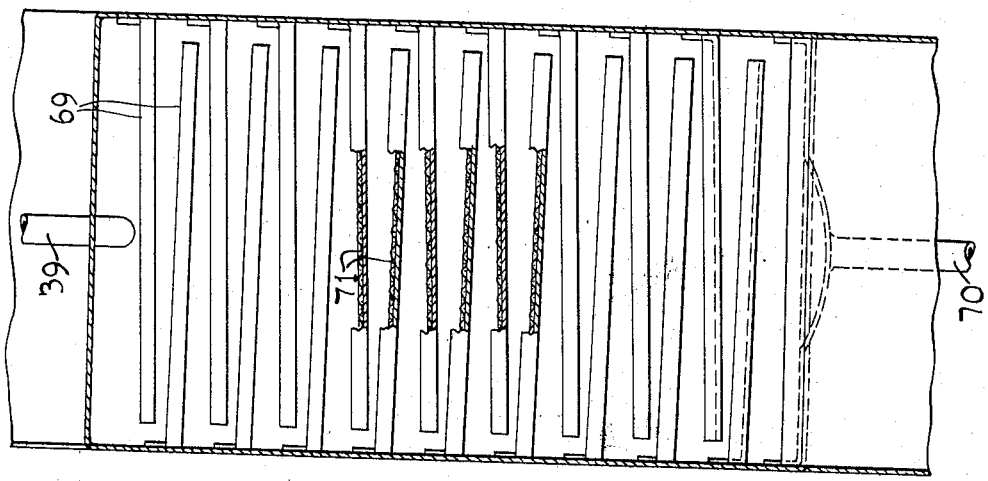
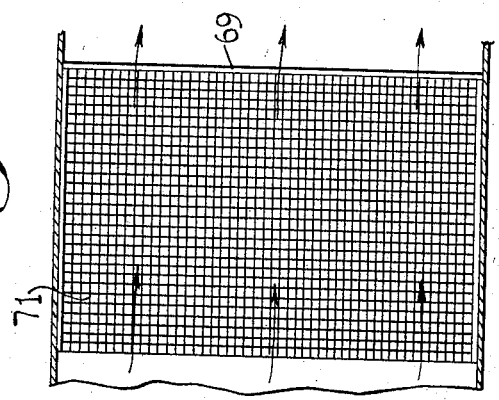
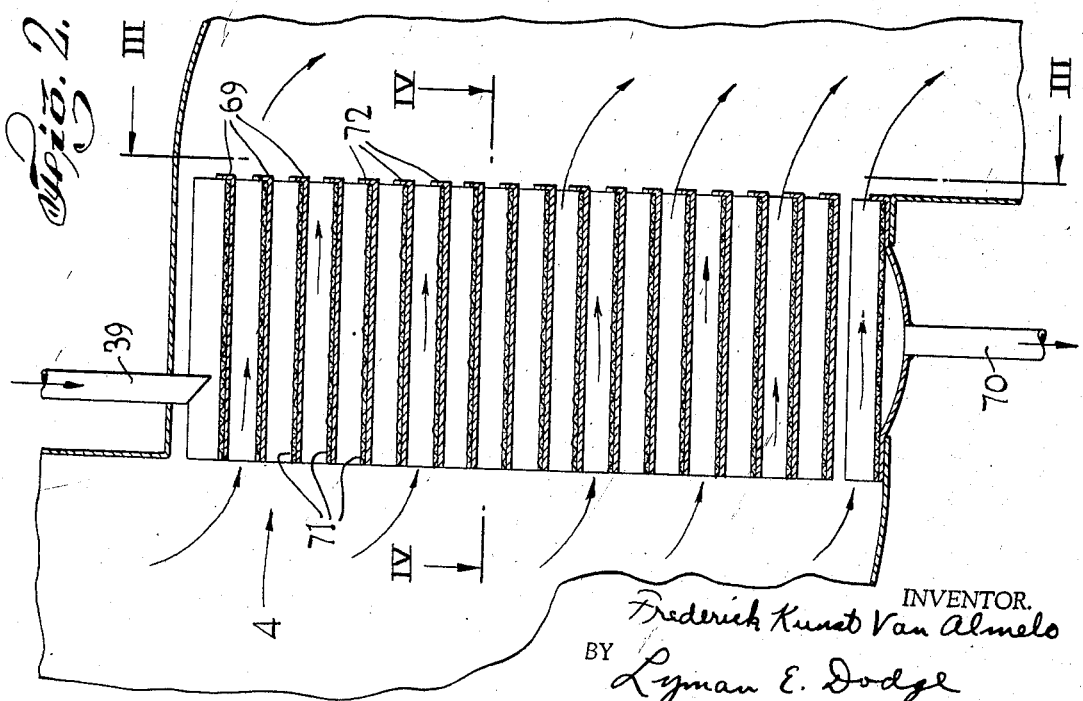
INVENTOR.
Frederick Kunst Van Almelo
BY Lyman E. Dodge
ATTORNEY Patented Nov. 2, 1943

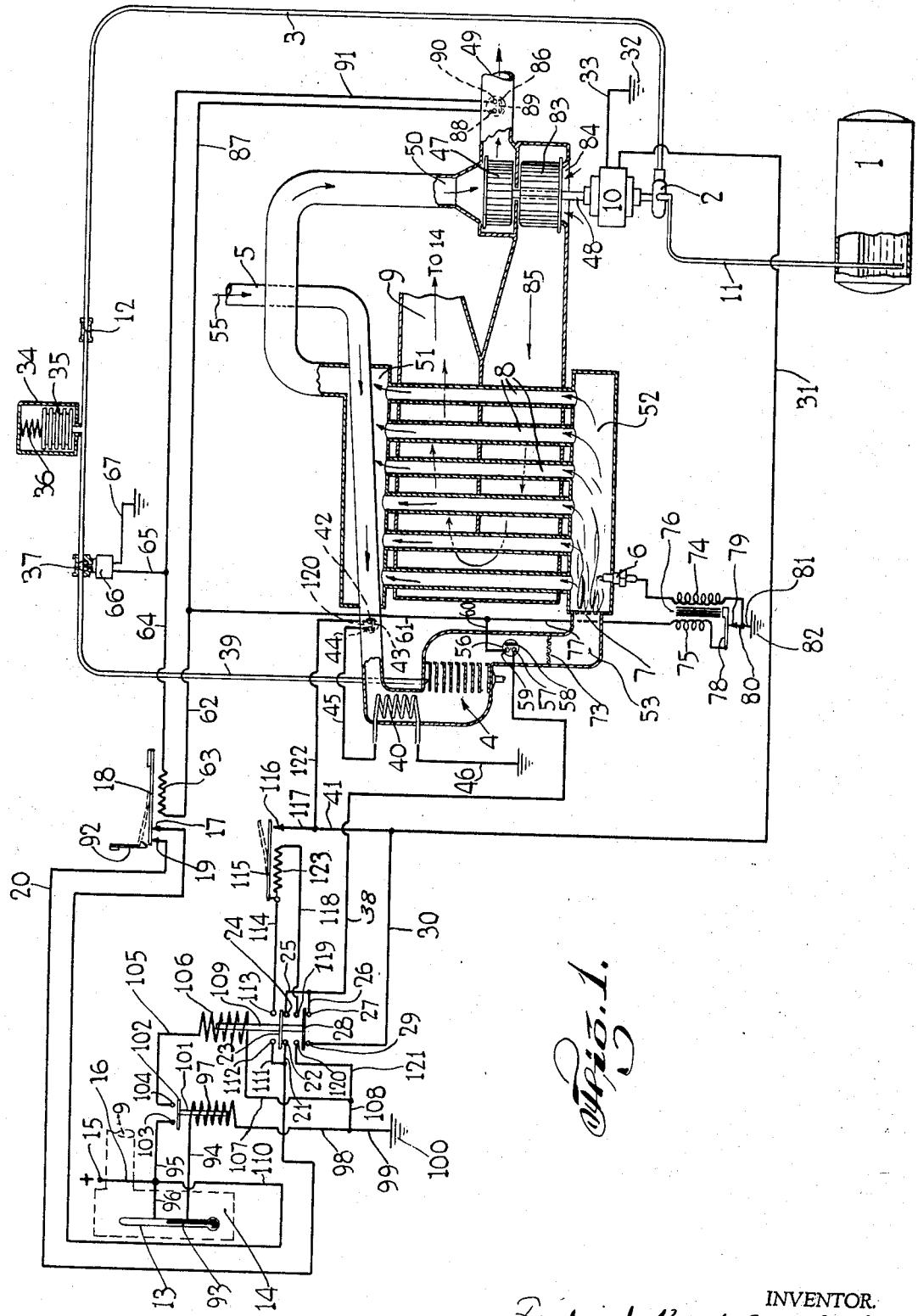

2,333,602

UNITED STATES PATENT OFFICE 2,333,602

HEATING

Frederick Kunst van Almelo, Nassau, N. Y., assignor to Consolidated Car Heating Company, Inc., Albany, N. Y., a corporation of New York Application April 9, 1941, Serial No. 387,698

6 Claims. (Cl. 158—28)

This invention relates to an arrangement for heating, especially space heating and particularly airplane heating.

A principal object of this invention is the production of a device of the type specified which affords a means for burning a vaporized fuel in a space which is at less than the surrounding atmospheric pressure.

A further object of the invention is the production of a device of the type specified which may heat air at greater than the surrounding atmospheric pressure, which air may be employed for space heating.

Further objects of the invention are the production of a device of the type specified in which liquid fuel under no greater pressure than atmospheric may be used; the fuel may be augmented in supply initially; the fuel may be vaporized at not greater than atmospheric pressure; and the entire device may be operated and controlled automatically.

Other objects and advantages will appear as the description of the particular physical embodiments selected to illustrate the invention progresses and the novel features will be particularly pointed out in the appended claims.

In describing the invention in detail and the particular physical embodiment selected to illustrate the invention, reference will be had to the accompanying drawings and the several views thereon, in which like characters of reference designate like parts throughout the several views, and in which:

Figure 1 is a diagrammatic or schematic illustration of an arrangement of heating apparatus embodying the invention; Fig. 2 is a fragmentary elevational cross-sectional view of a vaporizer used in the invention; Fig. 3 is a cross-sectional view of the device as shown by Fig. 2, on the plane indicated by the line III—III, viewed in the direction of the arrows at the ends of the line; Fig. 4 is a cross-sectional view of the device as shown by Fig. 2 on the plane indicated by the line IV—IV viewed in the direction of the arrows at the ends of the line.

The arrangement, generally considered, is for the purpose of supplying heat, especially to a space to be heated, and is particularly applicable for heating the passenger and other space in an airplane.

The device, generally considered, in the particular embodiment shown, is arranged for heating by a current of warm air. The warm air is preferably suitably moved by a circulating fan and is warmed by heat exchange with a body heated by the impact and contact of heated gases produced by the combustion of a vaporized liquid fuel, there being provided apparatus for vaporizing fuel and mixing air therewith.

The device further includes, generally speaking, suitable vaporizing and igniting mechanisms, suitable fuel pumping means, and suitable electric control circuits and devices whereby the arrangement is completely automatic in its operation.

In Figure 1, fuel supply tank 1 is shown. The fuel is pumped by pump 2 to a pipe line 3 which delivers it to a vaporizing device 4 over which a current of air is passed by means of a combustion air inlet duct 5. The vaporized fuel is ignited by the spark plug 6 and burned at the burner plate 7. The heat generated by the burning being communicated to heat exchange ducts or combustion product ducts, preferably made in the form of metallic pipes 8 which exchange the heat therein with a body of air passing through the duct 9 to the space to be heated. All of the various parts above described are operated and controlled by electric circuits acting through the intermediary of relays, circuit controllers and thermostats.

Figure 1 shows all parts of the device and arrangement in the condition in which they would be if the space to be heated is below the temperature at which it is desired to keep the space. This is indicated by the thermostat 13 which is assumed to be within the space to be heated 14 and which communicates with the duct 9.

Under the conditions shown in Fig. 1, the thermostat 13, by its condition, demands that heat be supplied to the space 14 and under the conditions current may flow in a circuit as follows: from the positive terminal 15 of the source of electromotive force, current may travel by the wires 16 and 110 to a contact point 17, shown as connected by the bi-metallic member 18 to the contact point 19, and thence by wires 20 and 21 to the contact point 22 connected by the conducting metallic bridge 23 to contact point 24 and thence by wires 25 and 26 to contact point 27 and conducting bridge 28 to contact point 29 and thence by wires 30 and 31 to electric motor 10 and thence to ground 32 by wire 33 and so back to the negative terminal of the source 15.

Current travelling in the above traced path will cause the motor 10 to rotate, operate the pump 2 and draw liquid fuel from the supply tank 1 through the pipe 11 and deliver it to the pipe 3 from whence it would pass through the restricted orifice 12 to a temporary reservoir 35.

The temporary reservoir 35 may be of any suitable or appropriate form but is preferably in the form of a hollow closed bellows or Sylphon, spring pressed by the expansion spring 36 bearing against one end of the bellows and at the other end against the other end of the yoke or cylinder 34.

When fuel is pumped through the restricted orifice 12 at a time when the valve 37 is closed, the fuel will flow into the temporary reservoir 35, compressing the spring 36 and expanding the bellows 35. At any rate, a volume of fuel will be built up and stored in the temporary reservoir 35 but this fuel cannot issue until electromagnet valve 37 is energized.

In order to, at first, energize electromagnetic valve 37 and so let fuel pass to the pipe 39, and so to the burner plate 7, it is first necessary to supply electrical energy to the auxiliary electric heating coil 40 for the purpose of heating the atmospheric air which is drawn in through the duct 5 and passes over the vaporizer 4 so that the fuel will be well and properly vaporized. The circuit for the energizing of auxiliary heating coil is as follows: positive terminal of the source 15, wires 16 and 110, contact point 17, bi-metallic bridge 18, contact point 19, wires 20 and 21, conducting bridge 23, wires 25 and 26, contact point 27, conducting bridge 28, contact point 29, wires 30, 41 and 122, contact point 42 on thermostat 120, conducting bridge 43 of the same thermostat and contacting point 44 of the same thermostat which thermostat, under the conditions assumed, that is, when air being drawn through the duct 5 is cold, is closed and makes a circuit therethrough and thence by wire 45 to one terminal of the auxiliary electric heater 40 and then through the electric heater and thence by wire 46 to ground and the negative terminal of the source.

Current travelling in the above traced path through the auxiliary heater 40 will heat this electric heater and, consequently, as the motor 10 is operating, and driving the exhaust fan 47 attached to its shaft 48, and as the exhaust fan 47 is positioned on a duct open to atmosphere at 49 and connecting through the portion 50, the head 51, the tubes 8, the flame chamber 52, the vapor duct 53, and the duct 5 to atmosphere, air is drawn in through duct 5, flowing in the direction of the arrow 55 through the duct 5 and over the auxiliary electric heater 40 and through the vaporizer 4 and over the thermostat 56. Under the initial conditions, that is, before heater 40 was energized, that is, when cold air was blowing over thermostat 56 the circuit therethrough was open but when air is heated by reason of the energization of auxiliary heater 40, the heated air acts upon thermostat 56 and causes a bridge to be formed across the contacts therein so that current will then flow in a circuit as follows: positive terminal 15, wires 16, 110, contact point 17, metallic bridge 18, contact point 19, wires 20, 21, contacting point 22, conducting bridge 23, contact point 24, wires 25 and 38, contact point 57 of thermostat 56, bridge 58 and contact point 59 and thence by wires 60, 61 and 62 to and through heating coil 63 and wires 64 and 65 to electromagnet 66, controlling valve 37 and thence by wire 67 to ground and to the negative terminal of the source.

Current flowing in the last above traced path through the electromagnetic valve 66 will energize that electromagnet and open the valve 37 so that fuel stored in the temporary reservoir 35 will flow through the pipe 39 on to the vaporizing device 4.

As soon as electromagnetic valve 66 is energized the fuel stored in the reservoir 35 is poured through pipe 39 in much more than normal quantity so that there is an augmented supply of fuel at the moment of starting the combustion but that after this fuel has all flowed from pipe 39 then the pipe 39 is supplied with a normal amount of fluid through the restricted orifice 12 which is not sufficient to cause any pressure in pipe 39 so that the fuel which is delivered normally by pipe 39 is at atmospheric pressure.

The vaporizing device 4 is shown in detail in Figs. 2, 3 and 4. It includes the supply pipe 39 and a series of shelves as 69. These shelves are, as best seen in Fig. 3, positioned with a slight slant to one side so that liquid which lands thereon will flow to the lower edge and thence over that edge and to the next shelf below and so on to the lowest shelf from whence it will flow into the overflow pipe 70 to be returned in any desired way to the fuel tank 1 or other places. The shelves are preferably provided with a flow obstructing device 71 thereon. This flow obstructing device is preferably a woven device and may well be ordinary wire screening and serves to prevent a too rapid flow of fuel from the shelf. The shelves also are provided with upstanding flanges as 72 which act to prevent the flow of air from blowing the fuel off the shelf.

When fuel from the pipe 39 falls upon the vaporizer 4 at a time when auxiliary heater 40 is heated and a current of air is flowing from the duct 5 through the vaporizer, the fuel will be vaporized and will pass through the safety screen 73 into the duct 53 and thence through the burner plate 7 into the combustion chamber 52.

It is apparent that when vaporized fuel issues from the burner plate 7 there must be means in the combustion chamber to ignite it. This ignition means is the spark plug 6 and the spark plug 6 is supplied with a high tension current in any suitable or appropriate means, preferably from the secondary 74 of an induction coil of which the primary is 75, having an iron core 76. The primary 75 is supplied with electrical energy from the same wire 60 which was used to supply energy to wire 61 to energize electromagnet 66 and the current flows from wire 60 through wire 77 to and through the primary 75 and to the vibrating armature 78, normally in contact with the contact point 79 which is connected by wire 80 and 81 to ground 82 and so connected to the negative terminal of the source.

When the spark plug operates and combustible vapor is issued through the burner plate 7, combustion takes place and hot gases are formed. Heat is communicated to the pipes 8 in passing therethrough and the gases after having parted with some of their heat pass into the chamber 51 and thence by the duct 50 induced by the vacuum caused by the exhaust fan 47 pass out through the discharge duct 49 to atmosphere.

Mounted on the same shaft 48 as the exhaust fan 47 is the pressure fan 83 which draws atmospheric air through the opening 84 and discharges it at somewhat more than atmospheric pressure into the duct 85 arranged to embrace the tubes 8 so that the heat of said tubes will be communicated to the air passing thereover in the duct 85 and issue through 9 and so go to the space 14 to be heated.

As the device continues in operation, gases drawn from duct 50 by fan 47 and discharged at 49 to the atmosphere are more and more heated and passing over thermostat 86 so act upon that thermostat that the thermostatic element therein closes the circuit therethrough so that, whereas up to that time the current for energizing electromagnet 66 flows from the wire 61 through wire 62 and through heating coil 63 and thence to electromagnet 66, it may now travel from wire 61, through wire 87, contact point 88, bridge 89, and contact 90, to wire 91 and thence by wire 65 to electromagnet 66 and so continue the energization of magnet 66. The object of this secondary circuit is to shunt the heating coil 63 because this is part of a safety device. If after all parts had operated to the point as hereinbefore described where combustion should have taken place in the chamber 52, it failed to do so, then thermostat 86 would not be heated. It would not, consequently, operate to close the circuit therethrough so that the current would still continue to flow through the heating coil 63. If current continued to flow through the heating coil 63 a sufficient length of time it would sufficiently heat bi-metallic member 18 so that it would curve upwardly as shown in dotted lines and the end thereof would latch itself on the latch 92 breaking the circuit at both the contact points 17 and 19. That is, if proper combustion does not take place within a predetermined time and if thermostat 86 is not sufficiently heated within a predetermined time, the safety cut-out will operate and in operating will cut off all energy from the positive terminal of the source 15, so that all parts cease to operate as hereinbefore described and fuel is no longer supplied to the vaporizer 4 so that there can be no danger of a large accumulation of fuel in a case where it is not properly vaporized and properly burned and the heat thereof properly transmitted to the thermostat 86. If everything works properly, however, the device will continue to operate, as hereinbefore described, supplying heated air to the space 14 which in time will cause the thermostat 13 to change its condition so that the mercury column 93 therein will connect the wires 94 and 96 which is a condition indicating that space 14 is sufficiently heated and the heater should cease functioning. The cessation of functioning of the parts as hereinbefore described when the mercury column 93 rises to the point where it connects with wire 96 is accomplished by the forming of electrical circuits which break the circuits hereinbefore described. The first circuit to be formed is as follows: positive terminal of the source 15, wires 16 and 96, mercury 93, wire 94, relay coil 97 and wires 98 and 99 to ground 100 and thence to the negative terminal of the source. Current travelling in the above traced path will energize the coil 97 and cause its core 101 to bring conducting bridge 102 in contact with contact points 103 and 104.

When 102 bridges the contact points 103 and 104 a circuit is formed as follows: positive terminal of the source, wires 16 and 95, contact point 103, conducting bridge 102, contact point 104, wire 105, circuit controller coil 106 and wire 107, 108, and 99 to ground 100 and thence to the negative terminal of the source of potential. Current flowing in the above traced path will raise circuit controller core 109 and conducting bridges 23 and 28 so that energy from the source will be cut off from all of the operating circuits hereinbefore described, so that the motor would stop operating if it depended solely upon the previously described circuit, and the spark plug would also be de-energized if it depended upon the previously described circuit, but notwithstanding the fact that the previously described circuit for operating the motor is broken at contact point 29, the motor will continue to operate in order to scavenge all of the remaining combustible fluid out of the combustion chamber and the associated conduits. The means for accomplishing this includes a circuit which is formed as follows: positive terminal of the source 15, wires 16 and 110, contact point 17, bridge 18, contact point 19, wires 20 and 111, contact point 112, conducting bridge 23 in the upper position, contact point 113, wire 114, bi-metallic strip 115, contact point 116 and wires 41 and 31 to the motor 10 and thence to the negative terminal of the source as hereinbefore described. Current flowing in the above traced path will keep the motor 10 operating to scavenge the combustion chamber 52 and the ducts connecting thereto together with the tubes 8 and the chamber 51.

At the same time that the circuit is formed through the motor 10 by way of the bi-metallic bridge 115 and the contact point 116, there is also another circuit formed through the heating coil 123 as follows: positive terminal of the source 15, wire 16, 110, contact point 17, bi-metallic bridge 18, contact point 19, wires 20 and 111, contact point 112, conducting bridge 23, contact point 113, wire 114, heating coil 123, wire 118, contact point 119, conducting bridge 28 in the upper position, contact point 120 and wires 121, 108 and 99 to ground 100 and thence to the negative terminal of the source. Current flowing in the above traced path will heat the heating coil 117 and in a predetermined time will cause the bi-metallic member 115 to break contact with contact point 116 and so cut off current from the motor 10 whereupon the motor 10 will be idle and all parts will remain in their operated positions, as hereinbefore described, until the mercury column 93 by reason of the cooling of the space 14 descends so as to break contact with the wire 96 and then the cycle will be repeated.

It is to be observed that if no air is flowing through duct 5, and auxiliary heater 40 is energized, then the electromagnetic valve 66 will not be energized, because the energization of electromagnetic valve 66 depends upon the closing of the contact in the thermostat 56 and this contact will not close unless heat reaches the thermostat and if no air is flowing in duct 5 at the time when the auxiliary heater 40 is energized, thermostat 56 will not become heated. Furthermore, due to the chimney effect, the heat from 40 will rise and going up through the duct 5 in the reverse direction will heat the thermostat 120 and cause the circuit to open therethrough, thereby shutting off the flow of current to the auxiliary heating coil 40. Of course, after coil 40 is de-energized, the thermostat 120 will also cool and a circuit therethrough will again be closed and the auxiliary heating coil again heated and so on. Electromagnetic valve 66 will not be energized and no fuel will be supplied through pipe 30, however, unless a current of air is flowing through the duct 5 in the proper direction.

It is to be observed that compared to the surrounding atmospheric pressure the pressure in combustion chamber 52, the tubes 8 and the chamber 51 is sub-atmospheric and the pressure in duct 85 around to the duct 9 and to 14 is super-atmospheric so that any danger whatever of combustion products leaking into the duct supplying the heated air to the space 14 is entirely avoided.

It is also to be observed that after the device is in operation the air drawn through duct 5 is heated, because that duct passes through chamber 51 and so the auxiliary heater is only needed to start the device. Furthermore while thermostat 56 is initially closed by heat from the coil 40, it is maintained closed by the air drawn through duct 5 and heated therein by the combustion.

Although I have particularly described one particular physical embodiment of my invention and explained the operation, construction and principle thereof, nevertheless, I desire to have it understood that the form selected is merely illustrative but does not exhaust the possible physical embodiment of the idea of means underlying my invention.

What I claim as new and desire to secure by Letters Patent of the United States, is:

1. A heater, including, in combination: a heat exchange duct; a combustion air inlet duct in heat exchange relation to said first mentioned duct whereby air passing therethrough may be heated; a combustion chamber communicating with said heat exchange duct; means in said combustion air inlet duct for vaporizing liquid fuel therein; means in said combustion air inlet duct between the means for vaporizing and the inlet adapted to supply heat; means governed by the temperature of the air passing through said combustion air inlet duct for governing said last named means; means for at times preventing the energization of said second named means; means for supplying liquid fuel to the first mentioned means; means for igniting vaporized fuel in the combustion chamber; and means creating a flow of air from atmosphere through said combustion air inlet duct, said combustion chamber, and said heat exchange duct to atmosphere.

2. A heater, including, in combination: a heat exchange duct; a combustion air inlet duct in heat exchange relation to said first mentioned duct whereby air passing therethrough may be heated; a combustion chamber communicating with said heat exchange duct; means in said combustion air inlet duct for vaporizing liquid fuel therein; means governed by the temperature in the combustion air inlet duct on the far side of the vaporizer from the inlet for supplying liquid fuel to the last mentioned means; means for igniting vaporized fuel in the combustion chamber; means creating a flow of air from atmosphere through said combustion air inlet duct, said combustion chamber, and said heat exchange duct to atmosphere; means allowing the supply of liquid fuel to continue for a predetermined time only; and means adjacent to the discharge to atmosphere controlling a continued supply of liquid fuel, in cooperation with the second above-named means.

3. A heater, including, in combination: a heat exchange duct; a combustion air inlet duct in heat exchange relation to said first mentioned duct whereby air passing therethrough may be heated; a combustion chamber communicating with said heat exchange duct; means in said combustion air inlet duct for vaporizing the liquid fuel therein; means for igniting vaporized fuel in the combustion chamber; means creating a flow of air from atmosphere through said combustion air inlet duct, said combustion chamber and said heat exchange duct to atmosphere; a supply of liquid fuel; a duct extending from said supply of liquid fuel to the means in said combustion air inlet duct for vaporizing liquid fuel, said duct including a pump therein for pumping the fuel, a restricted orifice for restricting the flow of fuel and an electromagnetically operated valve, closed when de-energized for completely obstructing the flow of fuel in said duct; an electric heater in said combustion air inlet duct positioned between the inlet to said duct and the means for vaporizing liquid fuel therein; a thermostat positioned in said combustion air inlet duct between said means for vaporizing said fuel and said combustion chamber, said thermostat adapted to complete a circuit therethrough when warmed to a predetermined temperature; means for energizing said electric heating coil and means controlled by said thermostat for energizing said electromagnetic valve controlling the fuel flow.

4. A heater, including, in combination: a heat exchange duct; a combustion air inlet duct in heat exchange relation to said first mentioned duct whereby air passing therethrough may be heated; a combustion chamber communicating with said heat exchange duct; means in said combustion air inlet duct for vaporizing the liquid fuel therein; means for igniting vaporized fuel in the combustion chamber; means creating a flow of air from atmosphere through said combustion air inlet duct, said combustion chamber and said heat exchange duct to atmosphere; a supply of liquid fuel; a duct extending from said supply of liquid fuel to the means in said combustion air inlet duct for vaporizing liquid fuel, said duct including a pump therein for pumping the fluid, a restricted orifice for restricting the flow of fuel and an electromagnetically operated valve, closed when de-energized, for completely obstructing the flow of fuel in said duct; an electric heater positioned in said combustion air inlet duct between the inlet to said duct and the means for vaporizing liquid fuel therein; a thermostat positioned in said combustion air inlet duct between said means for vaporizing said fuel and said combustion chamber, said thermostat adapted to complete a circuit therethrough when warmed to a predetermined temperature; means for energizing said electric heating coil and means controlled by said thermostat for energizing said electromagnetic valve controlling the fuel flow; and means operable after a predetermined time for preventing said thermostat from controlling the fuel supply.

5. A heater, including, in combination: a heat exchange duct; a combustion air inlet duct in heat exchange relation to said first mentioned duct whereby air passing therethrough may be heated; a combustion chamber communicating with said heat exchange duct; means in said combustion air inlet duct for vaporizing the liquid fuel therein; means for igniting vaporized fuel in the combustion chamber; means creating a flow of air from atmosphere through said combustion air inlet duct, said combustion chamber and said heat exchange duct to atmosphere; a supply of liquid fuel; a duct extending from said supply of liquid fuel to the means in said combustion air inlet duct for vaporizing liquid fuel, said duct including a pump therein for pumping the fluid, a restricted orifice for restricting the flow of fuel and an electromagnetically operated valve closed when de-energized for completely obstructing the flow of fuel in said duct; an electric heater positioned in said combustion air inlet duct between the inlet to said duct and means for vaporizing said fuel and said combustion chamber, said thermostat adapted to complete a circuit therethrough when warmed to a predetermined temperature; means for energizing said electric heating coil and means controlled by said thermostat for energizing said electromagnetic valve controlling the fuel flow; means operable after a predetermined time for preventing said thermostat from controlling the fuel supply; and means adjacent the discharge to atmosphere of said combustion air inlet duct controlled by the temperature of the gases being discharged for controlling the continued supply of fuel.

6. In a heater, including, in combination: a duct adapted to convey atmospheric air; a combustion chamber communicating with said duct; a first thermostat, an electric heater, a liquid fuel vaporizer and a second thermostat positioned in said air duct in the order stated, the last mentioned thermostat being closest to the combustion chamber; means including said first mentioned thermostat for controlling a flow of current through said electric heater, said first mentioned thermostat adapted to close a circuit therethrough only when not above a predetermined temperature; means controlled by said second thermostat for supplying fuel to said vaporizer, said second mentioned thermostat adapted to close a circuit therethrough only when not below a predetermined temperature; and means for inducing a flow of air through said air duct and means for utilizing the heat generated by the combustion of said liquid fuel.

FREDERICK KUNST van ALMELO.